Feb. 1, 1944. D. C. REYBOLD ET AL 2,340,848
APPARATUS FOR TREATING IMPURE LIQUIDS
Filed Dec. 18, 1941
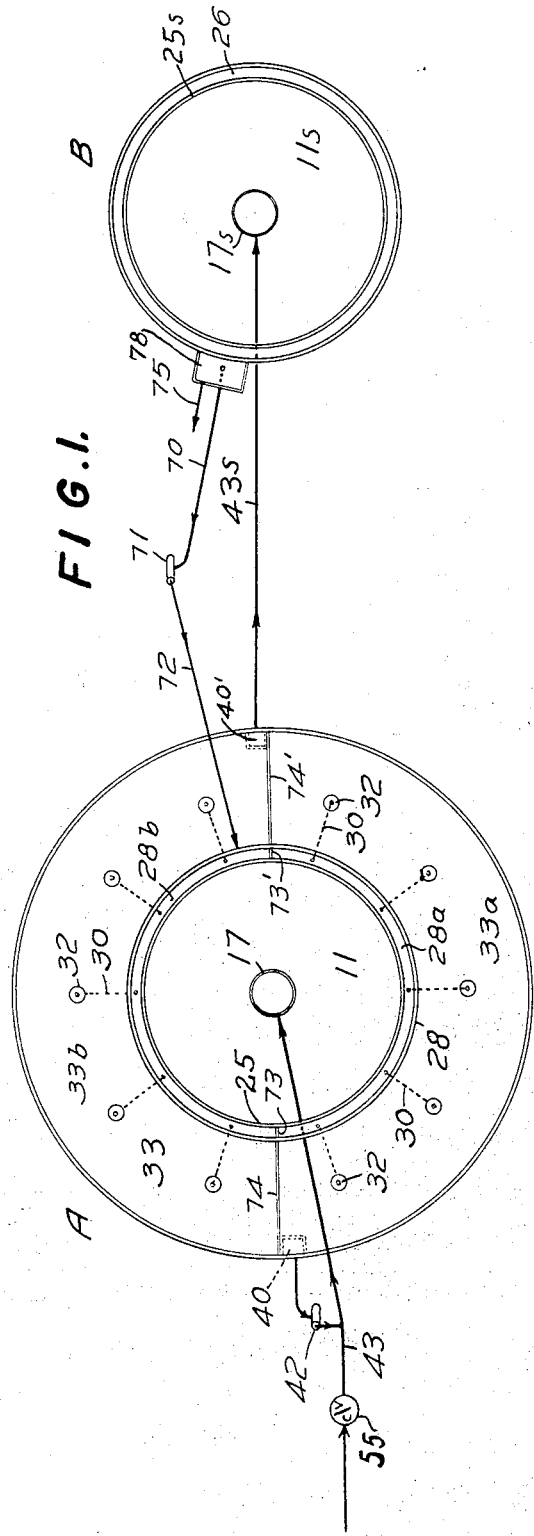
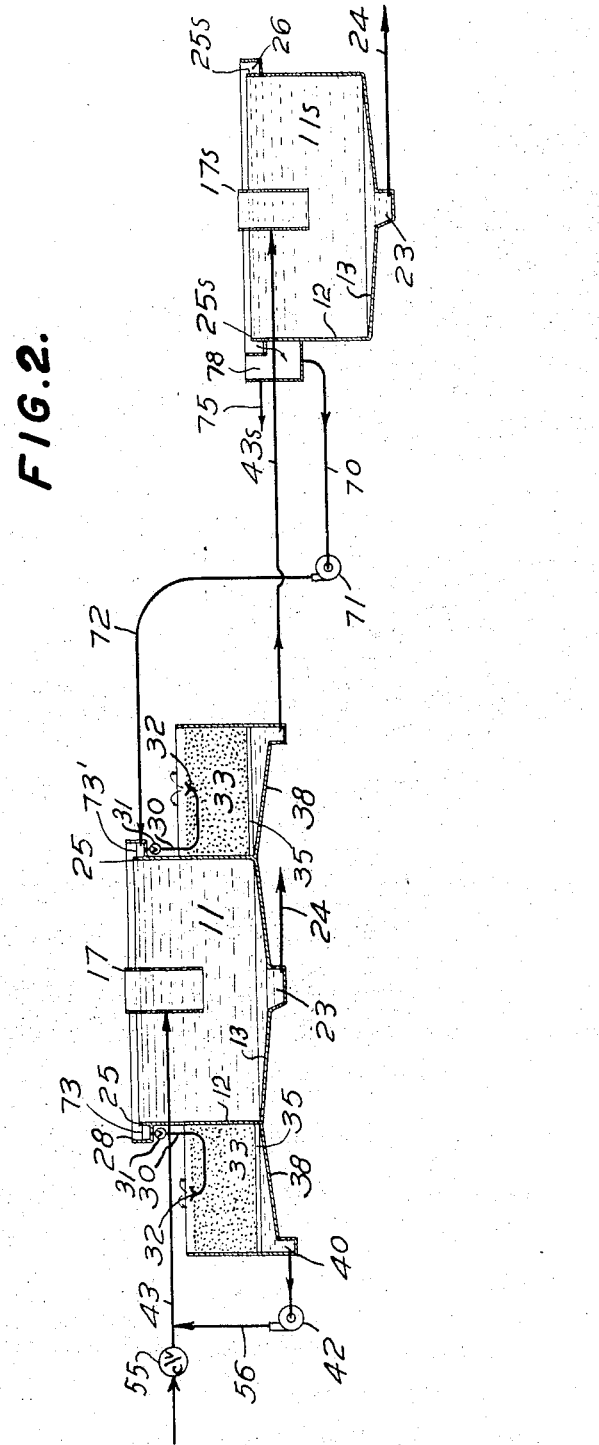
INVENTORS
ANTHONY J. FISCHER,
DOUGLAS C. REYBOLD,
BY Arthur Middleton
ATTORNEY.

Patented Feb. 1, 1944

2,340,848

UNITED STATES PATENT OFFICE 2,340,848

APPARATUS FOR TREATING IMPURE LIQUIDS

Douglas C. Reybold, Northbrook, Ill., and Anthony J. Fischer, Manhasset, N. Y., assignors to The Dorr Company, New York, N. Y., a corporation of Delaware Application December 18, 1941, Serial No. 423,430

12 Claims. (Cl. 210—5)

This invention relates to the purification of polluted or impure liquids such as sewage, trade-wastes and the like. In such purification, one recognized method in use today involves the use of a bed of discrete material containing biological organisms which include a wide range thereof from bacterial flora up to animal life as exemplified by worms. The biological organisms are depended upon to convert the unstable and putrescible or septical organics that render the liquid impure into stable innocuous substances. The organisms are also depended upon, at least in part, to render nonsettleable suspended solids more readily settleable.

The invention has relation to what is known in the sanitary engineering art, as trickling filter-beds. Of late it has come to be accepted that it is desirable to supply liquid to be treated in filter-beds at rates that would have been considered a few years ago as dangerously high. This invention has especial application to high-rate filter-beds. An outgrowth of the high-rate filter-bed is that there be associated with it a recirculation system whereby liquid being treated can be repeatedly or continually recirculated through the filter-bed. This permits the continuous dosing on the filter-bed of a liquid more uniform in character, and reduces the extreme fluctuations in flow. In most systems one or more detention tanks are associated with the filter and the recirculation system may be so arranged that filter effluent is recycled back to the detention tank or primary clarifier preceding the filter; or detention tank or secondary clarifier effluent is recycled back to the filter which precedes the detention tank. In either case the filter is dosed at such a rate with liquid containing micro-organisms favorable to the promotion of optimum biological conditions in the filter bed that clogging of the filter bed is avoided due to a continuous sloughing off of the solids that would normally tend to accumulate. At the same time, the recirculation from the filter to the primary clarifier or from the secondary clarifier to the filter dilutes the strength of the liquid fed to the filter so that it becomes more amenable to treatment. The detention tank is usually provided with means for mechanically cleaning it of deposited sediment to guard against septicity of the sediment, and the tank is one from which overflows a clarified effluent.

In recirculation types of trickling filter plants involving a filter and a clarifier in closed-circuit, the rate of filter application may be multiples of the rate of new feed incoming to the system. The new feed may be introduced at any suitable point. Likewise, the effluent may be discharged from the system at any desired point.

Among other advantages realizable, mention is made of the fact that recirculating trickling filter systems gave the unexpected result of permitting the use of filter beds only three feet or less in depth which could be operated at high efficiency. This permits the use of high filter loadings figured as pounds of B. O. D. per cubic yard of filtering media per day. It has been found that the efficiency of recirculating type filters increases as the amount of recirculation increases. The high rates of dosing tend to prevent clogging of the interstices between the discrete stone particles of the filter media; ample food is brought to the immotile biologic organisms of the bed; their excretions are washed away therefrom; and some of the organisms are washed into the clarifier so that biologic oxidizing activity of the septical organics is continued in the clarifier in addition to the bed where it is initiated. This method of operation also keeps down the filter-fly nuisance and further keeps down the odor nuisance.

The disadvantage of the use of such high recirculation rates, however, is that a large and expensive piping system is required to convey the clarified effluent to the trickling filter bed, otherwise a high loss of head will result, possibly requiring the pumping to the beds.

According to the present invention a liquid treating system is employed wherein a relatively shallow bed of discrete material is disposed in encircling arrangement with respect to a liquid-receiving tank of a type which may function as a clarifier. The tank is furthermore of a type having supernatant outflow means disposed about and leading from the upper marginal regions thereof. Also according to the present invention such shallow bed of discrete material functions as a trickling filter-bed extending to an elevation whereby gravitating filter effluent can be collected and, according to operative requirements, pumped back into the tank substantially against only a minimum or relatively low back pressure head. The top of the filter-bed is disposed at elevation sufficiently low so that there can always be realized a gravity flow of clarified liquid from the supernatant outflow means, to wit, from the region about the upper marginal portion of the tank, and consequent spraying of the gravity-conveyed liquid over the trickling filter-bed in a relatively uniform distribution. The use of the shallow bed encircling the tank with its surface lower than the liquid level in the clarifier tank assures the gravity feed to the filter-bed direct from the clarifier through a conducting and distributing means which may be relatively simple and of low cost. This may be through a means embodying a number of relatively uniformly but horizontally spaced individual pipes extending downwardly from the upper marginal regions of the tank and of which the pipes terminate in spray heads or other suitable liquid diffusing delivering means. Each of these pipes is preferably provided with a valve therein whereby the flow therethrough and therefrom may be adjusted to operative requirements or according to the particular type of operation decided upon. The use of a shallow bed encircling the clarifier assures gravity feed to the filter-bed direct from the clarifier through a pipe system of low cost.

In the practice of straight or once-through filtration, over which the recirculating type was an improvement, the overflow from a primary clarifier passes through the trickling filter where biological sludge is formed and the filter-treated liquid enters a secondary clarifier where separation of the liquid is effected into settled sludge and effluent.

The straight filter must be dimensioned and operated to effect as completely as possible the bilological purification and coagulation of sewage impurities within the interval allowed for a single passage through the filter. This necessitated a large volume of filter media and a depth of the filter which was accepted to be from 6 to 12 feet. This depth was so much the standard that it became a custom with sanitary engineers in specifying filter loads or capacities, to disregard the factor of filter depth as a constant and refer to filter capacity in terms of area or horizontal expanse only. Then there was accepted for filter capacity or load the dimension "m. g. a. d."; that is, "million gallons per acre per day."

Since the patentees are working essentially with a shallow filter-bed in circuit with a detention tank or clarifier, the invention has for one of its objects an arrangement for the proper integration of these elements while they are concentrically disposed, with the clarifier or detention tank in the center and the filter-bed or beds encircling the clarifier. Another object is to modify this arrangement for two-stage treatment. And a further object is to provide means for returning the filter-bed discharge back to be mixed with the liquid in the clarifier tank. A still further object is to provide means in this assembly for thoroughly distributing over the filter-bed area, the liquid passing thereto. Another object is to make such an assembly into an esthetically attractive design, for sewage-treating plants are being located increasingly in parks or other public spaces of municipalities that are more or less landscaped.

Another object is to provide an arrangement whereby the liquid from the clarifier can be supplied to the filter-bed and distributed thereover substantially uniformly while under a constant head. And a still further object is to devise apparatus for dosing the filter-bed direct from a launder of the clarifier.

As illustrative of a manner in which the invention hereof may be realized, reference is made to the accompanying drawing constituting a part of this specification.

In said drawing:

Figs. 1 and 2 are, respectively, plan and vertical sectional views diagrammatically illustrating two filter stages provided in a trickling filter bed disposed around a primary clarifier and arranged in operative association with a subsequent secondary clarifier tank.

The application upon which this patent is based originally contained Figs 1 to 7, inclusive. The descriptive matter particularly pertaining to original Figs. 1 to 5, inclusive, has been made the basis of divisional application, Serial No. 499,812, filed August 24, 1943, and hence those figures and certain description relating thereto have been eliminated herefrom.

Original Figs. 6 and 7 have been re-numbered and now stand as Figs. 1 and 2 hereof. The substance of the descriptive matter thereof continues herein. For a fuller description and amplification of detail features of concentrically arranged sedimentation units and trickling filter beds made of discrete material, one may refer to said divisional application and the patent thereupon, to wit, Patent No. 2,340,842, granted Feb. 1, 1944.

While the drawing hereof is diagrammatic, nevertheless it is believed that the disclosures thereof and the descriptive matter pertaining thereto avoid any necessity of a more extended amplification and description, particularly in view of the relatively detailed disclosure of the functioning parts available in the aforementioned divisional application and the patent granted thereupon.

In the figures hereof there is shown at A, sometimes herein referred to as stage A, the combination of a primary clarifier tank and a trickling filter bed of discrete material arranged in concentric relationship with respect to each other. The filter bed is designated as 33 and embodies a primary treating section $33^a$ and a secondary treating section $33^b$ as will hereinafter more fully appear.

In the construction shown the clarifier tank 11 is cylindrical and the trickling filter bed is annular in plan and surrounds the tank. At B there is a clarifier tank herein referred to as a secondary clarifier functioning as a sedimentation unit of a secondary treatment stage that is brought into operative relationship with respect to the primary clarifier and a secondary treating section of the trickling filter bed just mentioned. The primary clarifier or sedimentation tank, as it may be called, is designated 11 and the secondary clarifier or sedimentation tank is designated as 11S. Each of these clarifiers as shown is provided by a tank embodying a marginal or cylindrical side wall 12, and a tank bottom 13, the latter of which provides a sediment-receiving sump 23 from which sediment is conveyed at the will of an operator through a valve-controlled discharge pipe or conduit 24. Each of these clarifiers has a centrally located feed-receiving means in the form of a cylindrical baffle wherein incoming liquid to be treated in the particular clarifier is initially received and from which it is distributed into the body of liquid within the clarifier. This feed-receiving and distributing means—sometimes referred to as feedwell—for the primary clarifier, is designated as 17 and for the second clarifier as 17S.

The upper edge of the marginal wall of each tank is horizontal and functions as an overflow weir. Supernatant liquid from any one of the tanks must oveflow this edge or weir provided thereby before being received into a peripheral launder corresponding thereto provided at and about the upper edge portion of the tank. Such peripheral launder is sometimes referred to as an overflow-receiving launder and the peripheral launder for the primary clarifier tank is designated as 28, while that for the secondary clarifier tank is designated as 26. The overflow edge or weir provided for the primary tank is designated as 25, while that for the secondary tank is designated as 25S. The overflowed liquid received within the primary launder has gravity flow therefrom through descending horizontally spaced valve-controlled pipes 30 terminating into distributing heads 32. The valves for controlling the pipes 30 are designated as 31. These descending pipes have relatively uniform horizontal disposition with respect to each other whereby for the trickling filter bed sections served thereby there is realizable a relatively uniform distribution of liquid from the launder to and over each particular filter-bed section.

The trickling filter bed sections function as biologic treating means. The trickling filter bed is composed of any suitable material usually employed in beds of this type and it will be noted that the trickling filter bed which is annular in plan is divided by vertically-extending partition members 74 and 74' into that which may be referred to as a primary filter bed, or filter-bed section 33ª and a secondary filter bed or filter-bed section 33ᵇ. It will also be observed that low partitions or transverse weirs are provided in the primary clarifier launder 28 at 73 and 73' whereby that launder is divided into launder sections 28ª and 28ᵇ respectively, corresponding to the primary filter-bed sections 33ª and 33ᵇ. For this reason the launder section 28ª is sometimes referred to as a primary launder section and 28ᵇ is sometimes referred to as a secondary launder section. The launder section 28ᵇ may also be viewed as a commingling launder section, because there is a commingling therein of liquids received from different sources.

Incoming liquid or sewage to be treated is supplied from a main pipe line or conduit 43 and is delivered into the primary clarifier, to wit, within the feed-receiving means or cylindrical distributing baffle 17 thereof. As will hereinafter appear there may be introduced into this feed line 43, thus into the primary clarifier, recirculated effluent derived from the primary trickling-filter seciton 33ª. All of the liquid thus supplied for treatment into the primary clarifier, including that returned to the primary clarifier for re-treatment therein, must ultimately pass from the clarifier as supernatant liquid over the weir 25 into the launder 28. Of the supernatant that overflows into the launder 28, some will pass into section 28ª and some into section 28ᵇ thereof.

The partial partitions 73 and 73' may be described as overflow barrier means extending upwardly from the bottom of the launder 28 and terminating at elevation lower than that of the overflow weir edge 25. With such an arrangement there can take place a flow from one launder section past said barriers or transverse weirs 73 and 73' into the other launder section if and when liquid in one of said launder sections exceeds and rises higher than that in the other section and to elevation higher than the top of said members 73 and 73'.

The effluent passing through the trickling filter-bed sections 33ª and 33ᵇ is received on a sloping floor 38 underlying and common to said filter-bed sections. In the floor there is a sump for and corresponding to each of the filter-bed sections, namely, a sump 40 for receiving filter effluent from the primary filter-bed section 33ª and a sump 40' for receiving effluent from the secondary filter-bed section 33ᵇ.

It has already been pointed out that since the weir 25 of the primary clarifier has the same elevation for its entire periphery, some of the liquid overflow of this weir will pass into the primary launder section 28ª and some into the secondary or commingling launder section 28ᵇ.

Since the tops of the transverse barriers or partitions 73 and 73' do not extend upwardly to an elevation as high as that of the overflow weir 25, it will be manifest that by restricting the outflow from the primary launder section 28ª through the valve-controlled pipes 30 therefor, to wit, by partially closing the valve 31 of said pipes, it is possible to provide for a delivery of only a limited quantity of liquid from the primary launder section 28ª to the corresponding primary trickling filter-bed section 33ª and there follows a consequent flow of excess liquid from the primary launder section 28ª over and past the transverse barriers or weirs 73 and 73' into the secondary or commingling launder section 28ᵇ from which the liquid flows through the descending valve-controlled pipes 30 corresponding thereto for distribution to and over the secondary filter-bed sections 33ᵇ—this assuming that the valves 31 of the last mentioned set of pipes 30 are open. In this manner one can regulate or control the flow distribution to the different trickling filter-bed sections.

Mention has heretofore been made that the effluent from the primary trickling filter bed 33ª can be passed back to the feed-distributing means or cylindrical baffle 17 of the primary clarifier. This is accomplished by a pump drawing filter effluent from the primary collecting sump 40 and delivering the pumped effluent into feed line 43 at the discharge side of a check valve 55. This check valve 55 has been provided in said feed line 43 to assure a forward flow of pumped effluent into the feed-receiving and distributing means 17, or as otherwise expressed, to avoid a flow of pumped effluent in a backward direction counter to the flow of incoming sewage.

Respecting the secondary clarifier 11S and its functional connection and arrangement with respect to stage A, it will be observed that the secondary filter-bed effluent collects in a receiving pocket or sump 40' and is passed or discharged therefrom through feed-line 43S into the feed-receiving and distributing means 17S of the secondary clarifier. Incident to this transfer or discharge of secondary effluent from sump 40' there is a consequent overflow of supernatant liquid over and past the marginal top edge or weir 25S of the secondary clarifier into the overflow receiving launder 26 thereof from the latter of which there is an outflow into a receiving means providing a well or pocket 78. In this pocket or well 78 a certain quantity of liquid is retained whereby it is available for recirculation through the medium of a pumping means embodying a pump 71, a suction line 70 leading thereto from said well 78 and a pump discharge line 72 by which the liquid thus pumped is delivered into the aforementioned launder section 28ᵇ of the primary clarifier and wherein the returned pumped liquid is commingled with the liquid already therein. In this way the secondary clarifier 11S is brought into cyclic arrangement with the secondary trickling filter-bed section 33ᵇ.

It will be noted that while tank 11S functions as a clarification tank and it is also practicable to make it large enough to function as a storage and detention tank for holding a substantially large quantity of liquid undergoing purification as well as clarification. In such instance it detains as stored liquid, liquid which is progressively treated against septicity and which treatment may be continued to further purify the stored liquid. The return of some of the liquid from this secondary stage tank back to the trickling filter of the primary stage enables such utilization of the secondary tank and the accomplishment of such type or degree of sewage treatment as may be desired in or for the system as a whole.

From the upper portion of the pocket or well 78 there extends an outflow pipe 75 by which there is a release from the system hereof of clarified liquid which would otherwise accumulate therein.

Concerning the system just described and from the foregoing it will be noted:

That with respect to stage A thereof tank 11 and section 33ª of the trickling filter-bed are in cyclic arrangement and may be viewed as functioning as a primary cyclic unit of a multi-stage treating system;

That the incoming liquid supplied for treatment is initially delivered into tank 11 of the primary cyclic unit;

That trickling filter-bed section 33ᵇ of stage A has distributed thereover liquid passing thereto from said primary cyclic unit;

That trickling filter section 33ᵇ of stage A and tank 11 of stage B are in cyclic arrangement whereby they function as a secondary or subsequent cyclic unit;

That the cyclic treatment of this secondary cyclic unit can be carried out to attain the degree of clarification or purification desired; and That the treated effluent is released from the system as outflow from the tank 11 of stage B its ultimate release being along pathway 75 leading from the sump or well 78 that receives liquid overflowing weir 25 through the medium of launder 26.

In connection with each of the combined settling tanks and trickling filter-bed units shown in the drawing hereof, it will be noted that the depth of each trickling filter-bed is relatively shallow as compared with the depth of the tank. As shown the construction providing the bottom or floor of the trickling filter-bed is shown practically as an extension of the bottom of the tank. With this arrangement a feed-supply pipe or influent conduit such as 43 can, without undue excavation, be located so as to extend directly below the floor of the filter as well as that of the settling tank.

The elevation of the top surface of each trickling filter-bed is substantially lower than that of the surface level of the liquid in the tank with which it is associated, or, as otherwise expressed, lower than the launders from which liquid is gravitationally passed through valve-controlled downflow pipes such as 30 and 31 for distribution over the top of the bed.

In the instance of the form illustrated the height available for effecting this gravitational transfer is substantially that difference in elevation between the upper surface of the trickling filter-bed on the one hand and the elevation or approximate elevation of the overflow weir 25. This difference in elevation or static head available is preferably of the order of from 3 to 4 ft. of water.

We claim:

1. Apparatus for treating impure liquids comprising in operative combination and arrangement a primary settling tank, a secondary settling tank, means for passing sedimented material from the primary tank, means for passing sedimented material from the secondary tank, means for feeding impure liquid to the primary tank, a launder disposed for receiving supernatant liquid outflowing from the primary tank, a trickling filter-bed of discrete material disposed about the primary tank, partitioning means functionally dividing the filter-bed into a primary filter section and a secondary filter section, means providing a floor structure for said bed and having a sump for each filter section and serving for receiving effluent from the filter section to which it corresponds, valve-controlled means for passing from the launder some of the supernatant outflowed liquid therein and for distributing the liquid thereby passed upon the primary filter section, means for passing from the launder some of the supernatant outflowed liquid and for distributing the liquid thereby passed upon the secondary filter section, means for transferring effluent from the sump corresponding to the primary filter section into the primary tank, means for transferring filter effluent from the sump corresponding to the secondary filter section to the secondary tank, means providing a well associated with the secondary tank and serving for receiving as outflowed liquid supernatant liquid from the secondary tank, means for releasing as effluent from the well some of the liquid therein and means for passing from said well back to the secondary filter section some of the liquid within said well.

2. Apparatus for treating impure liquids as defined in and by claim 1, and according to which the primary tank is circular in plan, the launder extends along the upper marginal edge of the tank, and has overflow partitioning means rising from the bottom of the launder but terminating at elevation lower than any edge of the launder whereby some of the liquid in the launder can pass as overflow from a section of the launder corresponding to the primary section of the filter-bed to a section of the launder corresponding to the secondary section of the filter-bed.

3. Apparatus for treating impure liquids comprising in operative combination and arrangement a settling tank, means for passing sedimented material from said tank, means for feeding impure liquid to the tank, a marginal launder disposed for receiving supernatant liquid outflowing from the tank, a trickling filter-bed of discrete material disposed about the tank having substantially less depth than that of the tank and whose top surface is at elevation substantially lower than that of said launder, partitioning means functionally dividing the filter-bed into a primary filter section and a secondary filter section, means providing a floor structure for said bed having a sump for each filter-bed section and serving for receiving filter effluent from the filter-bed section to which it corresponds, means comprising horizontally-spaced valve-controlled downflow pipes for conducting from the launder some of the supernatant outflowed liquid therein and for distributing the liquid thereby conducted upon the primary filter section, means comprising horizontally-spaced downflow pipes for conducting from the launder some of the supernatant outflowed liquid and for distributing the liquid thereby conducted upon the secondary filter section, means for transferring effluent from the sump corresponding to the primary filter section to and into the tank, and means for transferring filter effluent from the sump corresponding to the secondary filter section.

4. Apparatus for treating impure liquids as defined in and by claim 3, and in which the launder is provided with transverse overflow partitions rising to elevation lower than that of the upper edges of the launder and disposed for dividing the launder into a section from which liquid is supplied directly to the primary filter-bed section, and a section that also receives liquid overflowing said partitions and from which liquid is supplied directly to the secondary filter-bed section.

5. Apparatus for treating impure liquids comprising in operative combination a settling tank, means for passing sedimented material from said tank, means for feeding impure liquids to the apparatus for treatment therein, a launder having partitioning means dividing it into functionally separated sections of which one is a primary section while another is a secondary section, which sections are disposed for simultaneously receiving supernatant liquid overflowing directly thereinto from the tank because of having overflow weir edge portions at the same elevation, a primary trickling filter bed section of discrete material, a secondary filter bed section of discrete material, means providing a floor structure having a sump for and corresponding to each filter bed section and serving for receiving filter effluent from the filter bed section to which the sump corresponds, means comprising downflow pipes for passing liquid from the primary launder section and for distributing it upon the primary filter section, means for pumping effluent from the sump of the primary filter bed section back to the tank, means for passing liquid from the secondary launder section and for distributing it upon the secondary filter section and means for discharging filter effluent from the sump corresponding to the secondary filter section.

6. Apparatus for treating impure liquids which comprises a two stage plant of which the first stage comprises a clarifier tank and a circumjacent trickling filter-bed having a bottom that supports discrete filter media, a sump section in said bottom, a pump for drawing filter discharge from the sump, means for removing sediment from the tank, a conduit for the supply of feed liquid to the tank, a connection between the pump and the conduit, launder means for determining the liquid level in the tank and for receiving liquid overflowing thereinto from the tank, gravity operated flow means for conducting liquid from the launder means to the filter-bed and for distributing such liquid thereover; the second stage comprising a secondary clarifier tank having a launder for receiving liquid overflowing thereinto from the secondary tank, means for removing sediment from the secondary tank, means for releasing treated effluent liquid from the secondary tank, pump means for conducting liquid from the launder of the secondary tank to the first stage, and means for conducting filterbed discharge as supplied feed liquid to the secondary tank.

7. A unit for treating impure liquids comprising in operative combination a settling tank, means for passing sedimented material from said tank, means for feeding impure liquids to the unit for treatment therein, a launder having partitioning means dividing it into functionally separate contiguous sections of which one is a primary section and the other is a secondary section, which said launder sections are disposed for simultaneously receiving supernatant liquid overflowing directly thereinto from the tank past weir edge portions of said launder sections, which said partitioning means extends upwardly to an elevation substantially higher than that of the lower interior portion of the launder but has an overflow top portion at elevation lower than that of said overflow weir edge portions of said launder sections, a primary trickling filter bed section of discrete material, a secondary filter bed section of discrete material, means providing a floor structure having a sump for and corresponding to each filter bed section and serving for receiving filter effluent from the filter bed section to which the sump corresponds, means for passing liquid from the primary launder section and for distributing it upon the primary filter bed section, means for transferring effluent from the sump of the primary filter bed section back to the tank, means for passing liquid from the secondary launder section and for distributing it upon the secondary filter bed section, and means for discharging filter effluent from the sump corresponding to the secondary filter bed section.

8. A unit for treating impure liquid as defined in and by claim 7, according to which the tank is circular in plan, according to which the launder extends along the marginal edge of the tank and has a member circular in plan providing an overflow launder weir having the same elevation for its entire length whereby of the supernatant outflowing from the tank some will pass one portion of said weir as overflow into the primary launder section and some will pass another portion of said weir as overflow into the secondary launder section, and according to which the partitioning means comprises transverse members extending across the launder for the full width thereof and upwardly from the bottom of the launder and of which at least one of said transverse members terminates at elevation lower than that of the overflow weir and serves as a liquid-overflow means between the primary and secondary launder sections and over which some of the liquid when high in one of the launder sections can pass into the other launder section.

9. A unit for treating impure liquid as defined in and by claim 7; in which the launder has a member providing an overflow weir having the same elevation for a substantial length thereof whereby of the supernatant liquid outflowing from the tank some will pass the weir as overflow into the primary launder section and some will pass the weir as overflow into the secondary launder section; and in which the partitioning means extends upwardly from the bottom of the launder and across the launder for the full width thereof and terminating at elevation lower than that of the overflow weir for thereby dividing the launder into functionally distinct primary and secondary launder sections while providing an overflow means between said sections over which some liquid in one of said launder sections can overflow into the other of said launder sections.

10. A unit for treating impure liquids comprising in operative combination and arrangement a settling tank, means for passing sedimented material from said tank, means for feeding impure liquid to the unit, means providing a primary launder section disposed for receiving supernatant liquid outflow from the tank, means providing a secondary launder section for receiving supernatant liquid outflow from said tank, said launder sections having members providing overflow weirs at substantially the same elevation and over which supernatant liquid from the tank simultaneously passes on its way to said launder sections, a primary trickling filter bed of discrete material, a secondary trickling filter bed of discrete material, means providing floor structure for said beds and having a sump for and corresponding to each filter bed for receiving filter effluent from the filter bed to which the sump corresponds, primary transfer means for passing liquid from the primary launder section to the primary trickling filter bed, a secondary liquid transfer means for passing liquid from the secondary launder section to the secondary trickling filter bed, means for transferring into the tank filter effluent from the sump corresponding to the primary filter section, and means for discharging filter effluent from the sump corresponding to the secondary filter section.

11. A unit according to claim 10 in which the launder sections have liquid transfer means between them for releasing excess liquid from one launder section into the other.

12. A unit for treating impure liquids comprising in operative combination and arrangement a settling tank, means for feeding into the unit impure liquid to be treated, means for passing sedimented material from said tank, a marginal launder disposed for receiving supernatant liquid outflowing from the tank past a member providing an overflow weir edge, transversely extending partitioning means within the launder rising from the bottom thereof for dividing the launder into functionally separate primary and secondary launder sections, said partitioning means terminating at an elevation lower than that of the aforesaid overflow weir edge whereby according to operating conditions there is permitted an overflow release of liquid from one launder section past said partitioning means into the other launder section, a primary trickling filter bed of discrete material, a secondary trickling filter bed of discrete material, means by which liquid from the primary launder section is passed to and distributed over the primary trickling filter bed, means by which liquid from the secondary launder section is passed to and distributed over the secondary trickling filter bed, means for collecting primary filter effluent and for conducting at least some of the same back into the tank, and means for collecting secondary filter effluent and for releasing a quantity of the same from the unit.

DOUGLAS C. REYBOLD.
ANTHONY J. FISCHER.